United States Patent Office 3,053,252
Patented Sept. 11, 1962

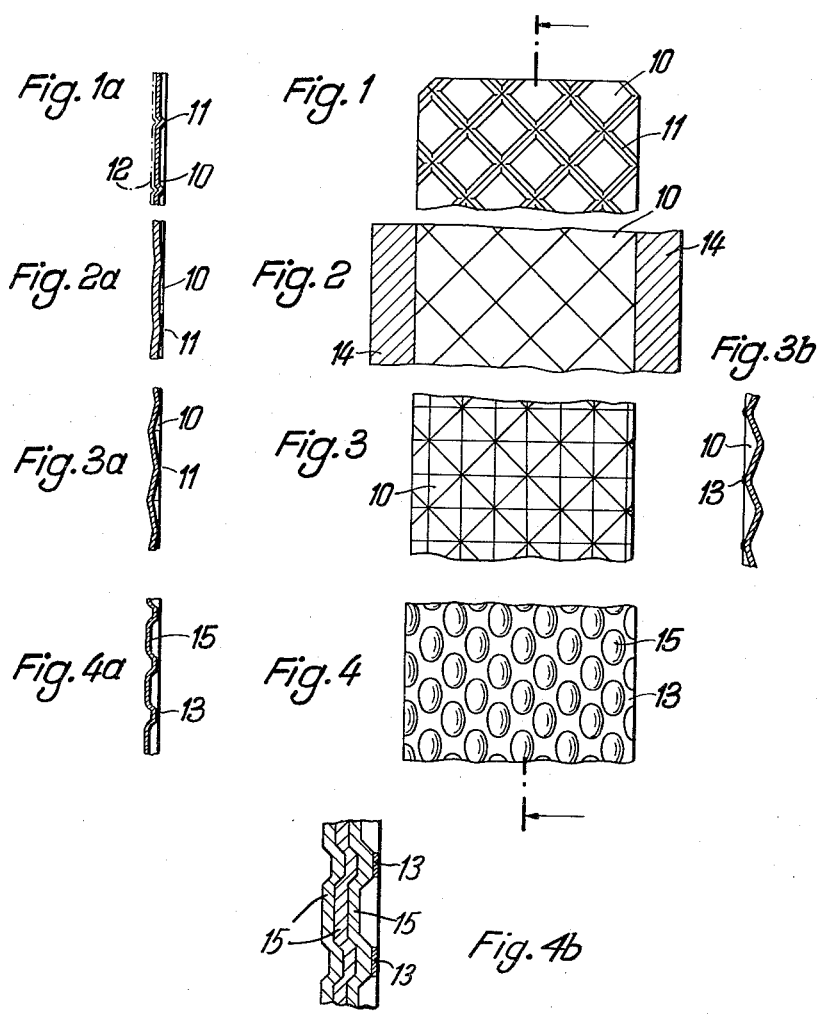

3,053,252
EMBOSSED BANDAGING MATERIAL
Helmut Wolf, Neuwied (Rhine), Germany, assignor to Lohmann K.G., Fahr (Rhine), Germany
Filed Feb. 10, 1958, Ser. No. 714,218
3 Claims. (Cl. 128—156)

In addition to ordinary woven bandaging material, bandaging material is known which has a smooth surface for application onto the wound to be bandaged. Such material consists for instance, of synthetic strips or threads from which is formed a closed non-absorbent layer porous to moisture. Furthermore, dressings have been described which consist of a smooth synthetic foil provided with perforations; the smooth synthetic foil is non-absorbent and yet renders possible the passage of wound secretions, blood and so on through the perforations. With both kinds of bandaging materials it is necessary to back the non-absorbent dressing with absorbent material, such as cellulose, cotton or the like, in order to be able to soak up wound secretions.

With bandaging material where the dressing consists, for instance, of threads which differ in their power of absorption, the threads facing the wound alter their position under the influence of moisture, with the result that the healing process may be effected.

In contrast thereto, the invention provides a bandaging material, particularly for treatment of wounds, which comprises a consolidated or condensed absorbent fibrous material which is reinforced on the wound surface by means of areas of the fibrous material itself which areas are made non-absorbent. Because of the consolidation of the fibrous material, the latter is resistant to deformation; yet at the same time it is made absorbent. The non-absorbent areas are formed by local consolidation, for example embossing, of the material, or by coating with non-swelling material.

The non-absorbent areas of the surface preferably consist of reinforcing points or supporting edges for the absorbent areas of the material; laminated supporting edges are then provided with a physiologically inert coating of moisture-proof synthetic material. Prevention of absorbtion can also be effected by a local impregnation of the material at the support points or edges.

According to a preferred feature of the invention the support surfaces or edges project beyond the absorbent surfaces towards the wound side, that is, as it were, in the perpendicular plane, so that an embossed pattern of absorbent areas and non-absorbent support surfaces or edges will be obtained. The embossed pattern may have any suitable form.

According to a further feature of the invention the consolidated fibrous material is made, either as a smooth or an embossed bandaging material, so that smooth or pattern-like embossed layers of bandaging material placed closely one upon another form a locally absorbent and non-absorbent wound covering. In this way, for instance, the absorbent power is increased at the absorbent spots. In this way, by closely placing layers of bandaging material one upon the other, bandaging material of varying thickness may be obtained for various types of wound treatment.

That side of the bandaging material which faces away from the wound may have a non-absorbent coating, but care must be taken that absorbency is retained on the side facing the wound.

The absorbent areas may also contain medicaments as additions, without thereby affecting their absorbency. Depending on the purpose for which the bandaging material is intended, the bandaging material may be produced in rolls or strips; the strips may also be provided with attached holding strips, which may have an adhesive coating. It is also possible to make the non-absorbent areas locally adhesive.

Specific embodiments of the invention will now be described, by way of example, with reference to the accompanying drawing in which:

FIGURE 1 shows a bandaging material having a square embossed pattern with pointed support edges on the wound side, FIGURE 1a shows a cross-section of the bandaging material shown in FIGURE 1, FIGURE 2 shows a bandaging material having a flat embossed pattern, FIGURE 2a shows a cross-section of the bandaging material shown in FIGURE 2, FIGURE 3 shows a bandaging material having an embossed pattern in the shape of flat pyramids, FIGURE 3a shows a cross-section of the bandaging material shown in FIGURE 3, and FIGURE 3b shows a cross-section of a modification of the bandaging material shown in FIGURE 3, FIGURE 4 shows a bandaging material having an embossed pattern with cup-like recesses, FIGURE 4a shows a cross-section of the bandaging material shown in FIGURE 4, and FIG. 4b is a cross section similar to that of FIG. 4a but with a plurality of layers of bandaging material and shown on a somewhat larger scale than FIG. 4a.

Throughout the drawing, the absorbent areas are numbered 10 and the support surfaces or edges are numbered 11. In FIGURE 1a the section shows a back layer 12 of non-absorbent material the non-absorbent coating being indicated by chain line. The support edges 11 may be covered with non-absorbent plastic material not affecting wounds. According to FIGURE 4, the supporting surface on the wound side has applied thereto a coating 13 of synthetic material, adhesive or the like which is inert to wounds. The absorbent spots then have the form of embossed cups 15 which may, of course, also be of any other suitable form.

The bandaging may be produced in the form of strips cut as desired, for instance in the form of strips cut for wound dressings. It is then possible to provide specially formed or protruding edges 14 (FIGURE 2) with an adhesive coating, for instance for producing bandages for quick application.

The bandaging material shown in FIGURE 3 is embossed with a pattern in the form of flat pyramids the form of which is indicated in the sectional view of FIGURE 3a. FIGURE 3b shows the points of the pyramids on the wound side of the material provided with coatings 13 of moisture-proof material or suitable plastic material or the like. The support edges or support points are suitably flattened according to the purpose for which the bandaging material is intended.

The invention will be further described in the following examples:

*Example 1*

A strip cut from a larger strip and embossed with a pattern as shown in FIGURE 4 is applied to the wound in such a way that the supporting surface provided with a neutral synthetic coating 13 rests on the wound. The cup-like absorbent recesses 15 then absorb the wound secretions. If several strips embossed in like manner are laid directly one upon another, as shown in FIG. 4b, the supporting surfaces 13 or the absorbent cup-like recesses 15 will always be located one above the other. Thus bandaging material can be obtained with greater or less absorbency as required by placing layers one above the other. As a result of the considerable direct absorption, a rapid drying of the wound, and hence an acceleration of the healing process, is quickly effected.

*Example 2*

A quick-application bandage provided with an embossed pattern as shown in FIGURE 2 is applied, for instance in roll form, with the adhesive edges 14 next to the wound. The wound is next protected by the absorbent surface 10. For quick-application bandages a backing layer 12 (FIGURE 1a) is advantageously employed. In this way a quick-application bandage, which if required may be skin-coloured, is given a washable upper surface.

The bandaging material consists of consolidated fibrous material which is preferably produced without foreign substances. Outwardly the material is completely smooth, so that the fibers present cannot swell into the wound. The bandages can be made in different thicknesses according to the number of consolidated fibrous webs and can be given the desired degree of absorbency by laying the materials one above the other, in which connection the embossed pattern serves to ensure that absorbent and non-absorbent areas always lie one above the other. It is thus possible to fit the bandage to the size of the wound, or to staunch particularly deep, vigorously bleeding wounds, or wounds of a special nature.

Thus, for example, a pore size of about 60–130 microns produced in the material ensured a surprisingly high degree of absorption, and a suitable choice of the embossed pattern provides the further possibility of adaptation in respect of the distribution of absorbent and non-absorbent areas. Furthermore the absorbent power may be varied, for instance by steeper or flatter pyramid embossings being used. The absorbent pores are distributed absolutely regularly over the surface of the bandaging material, so as to avoid any complications in application.

By contrast with known woven or foil bandaging materials the advantage is obtained in that, according to the invention, a single-layer, non-woven, wound dressing is generally sufficient. This greatly simplifies storage of the bandaging material, and the care of the wound.

The edges 11 may also be reinforced by an inlay of fine metal wires. That side of the bandaging material which is applied to the wound, may be given an identifying color.

What I claim is:

1. A bandaging material consisting essentially of a single, continuous, non-perforate sheet of fibrous, non-woven, embossed material, said sheet being provided on one side with a series of substantially non-absorbent, protruding, supporting portions of small area for contacting the wound, and said sheet being provided on the other side with a series of relatively absorbent, embossed portions of greater area.

2. A bandaging material consisting essentially of a single, continuous, non-perforate sheet of fibrous, non-woven, embossed material, said sheet being provided on one side with a series of substantially non-absorbent, protruding, supporting portions of small area for contacting the wound, said portions being provided with a moisture resistant coating, and said sheet being provided on the other side with a series of relatively absorbent embossed portions of greater area.

3. A bandaging material consisting essentially of a single, continuous, non-perforate sheet of fibrous, non-woven, embossed material, said sheet being provided on one side with a series of substantially non-absorbent, protruding, supporting portions of small area for contacting the wound, and said sheet being provided on the other side with a series of relatively absorbent embossed portions of greater area, said embossed portions being arranged in a uniform and continuous pattern.

References Cited in the file of this patent

UNITED STATES PATENTS

| 1,863,333 | Heitmeyer | June 14, 1932 |
| 2,344,021 | Bouziane | Mar. 14, 1944 |
| 2,858,830 | Robins | Nov. 4, 1958 |
| 2,896,618 | Schaefer | July 28, 1959 |

FOREIGN PATENTS

| 729,285 | Great Britain | May 4, 1955 |
| 776,408 | Great Britain | June 5, 1957 |